United States Patent [19]

Baer

[11] Patent Number: 4,712,887
[45] Date of Patent: Dec. 15, 1987

[54] OPTICAL SYSTEM FOR FAST ACCESS OPTICAL DATA STORAGE DEVICE

[75] Inventor: James W. Baer, Boulder, Colo.

[73] Assignee: Dazar Corporation, Boulder, Colo.

[21] Appl. No.: 811,380

[22] Filed: Dec. 20, 1985

[51] Int. Cl.[4] .................................... G02B 26/08
[52] U.S. Cl. ................................ 350/484; 350/6.3; 350/6.9
[58] Field of Search ............ 350/247, 255, 6.3, 6.5, 350/6.9, 453, 415, 484, 6.1; 369/44, 45

[56] References Cited

U.S. PATENT DOCUMENTS

| | | | |
|---|---|---|---|
| 3,861,786 | 1/1975 | Badgett | 350/255 |
| 3,911,209 | 10/1975 | Bouwhuis | 178/6.6 R |
| 3,944,727 | 3/1976 | Elliott | 178/6.6 R |
| 3,959,581 | 5/1976 | Laub | 178/6.6 R |
| 4,003,059 | 1/1977 | Sugiura et al. | 346/108 |
| 4,030,815 | 6/1977 | Andrevski et al. | 350/255 |
| 4,051,529 | 9/1977 | Miyaoka | 369/112 |
| 4,123,780 | 10/1978 | Honjo | 358/128 |
| 4,125,859 | 11/1978 | Oshida et al. | 358/128 |
| 4,218,112 | 8/1980 | Ruker | 350/8 |
| 4,223,348 | 9/1980 | Oinoue et al. | 358/128.5 |
| 4,234,837 | 11/1980 | Winslow | 318/577 |
| 4,302,830 | 11/1981 | Hamaoka et al. | 369/45 |
| 4,322,838 | 3/1982 | Neumann | 369/45 |
| 4,344,164 | 8/1982 | Bricot et al. | 369/44 |
| 4,354,103 | 10/1982 | Immink et al. | 250/201 |
| 4,374,324 | 2/1983 | Van Rosmalen et al. | 250/201 |
| 4,423,496 | 12/1983 | Opheij et al. | 369/46 |
| 4,451,913 | 5/1984 | Elliot | 369/110 |
| 4,475,179 | 10/1984 | Geyer | 365/215 |
| 4,482,987 | 11/1984 | Okada et al. | 369/44 |
| 4,488,275 | 12/1984 | Ceshkovsky et al. | 369/44 |

FOREIGN PATENT DOCUMENTS 0041448 3/1983 Japan .................................. 369/45

Primary Examiner—John K. Corbin
Assistant Examiner—Vincent J. Lemmo
Attorney, Agent, or Firm—Rosen, Dainow & Jacobs

[57] ABSTRACT

An optical head structure, movable to scan over a disk surface, includes a fixed optical arrangement. Fine focussing and side-to-side adjustments for scanning are effected by movements of another lens mounted on a substantially stationary part of the system structure. The movable lens is generally aligned with the axis of the fixed lens on the movable head structure. In an alternative embodiment, lateral adjustments of scanning spot position are made by pivoting a reflecting mirror on the stationary structure and axial adjustments of the scanning spot are made by axially moving a lens on the fixed structure. Light paths in the movable head structure are altered by reflecting mirrors, all such mirrors being in fixed relationship with the fixed objective lens. The movable head structure bearing fixed lenses and fixed mirrors mvoes in an arc, not concentric with disk rotation, to traverse the disk and locate a desired track.

14 Claims, 7 Drawing Figures

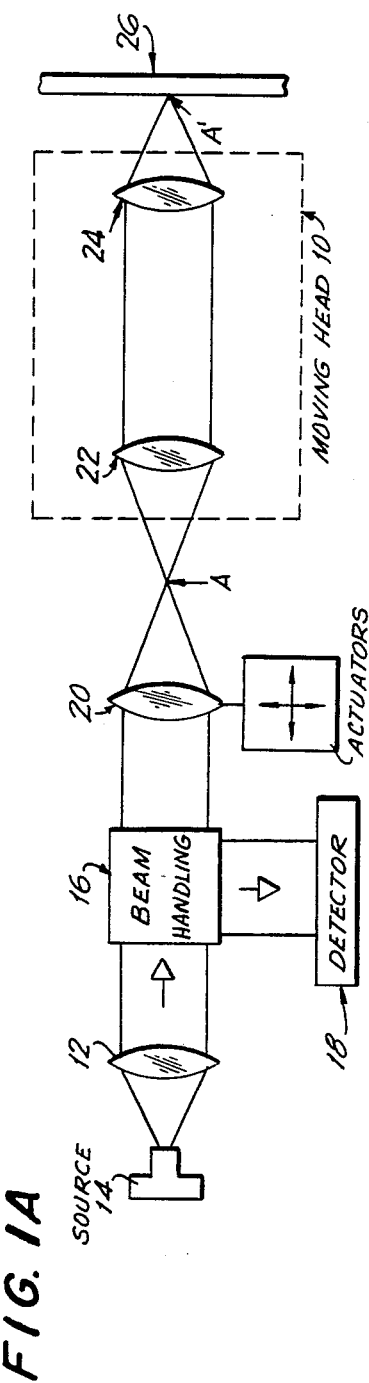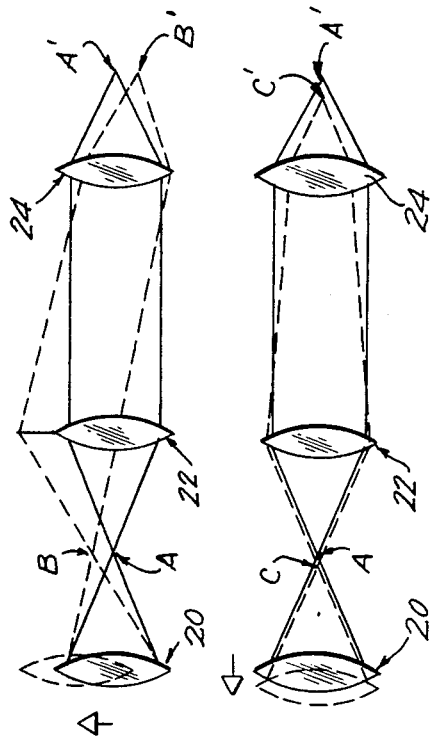
FIG. 1A
FIG. 1B
FIG. 1C

OPTICAL SYSTEM FOR FAST ACCESS OPTICAL DATA STORAGE DEVICE

BACKGROUND OF THE INVENTION

In any optical data storage device, be it a video disk, a compact disk player, a compact disk ROM data reader or a machine capable of reading and writing, the focused point of light must be made to follow the data track with high accuracy. This involves automatically maintaining focus and tracking to fractions of a micron. The actuators commonly used to do this are large and heavy, compared to the actual optics forming this focused point. This size and weight reduces the speed with which such a device can be made to search the data region, thus limiting the applicability of these devices to a small fraction of the data storage market.

The conventional method for causing the focused spot to follow the track has been by moving the focussing objective lens. Such a device first moves the entire optics to a position above the general region of the data to be accessed. The lens is then moved axially, that is, parallel to the rotating axis of the disk, to maintain the accuracy of focus while the disk is spinning. The lens is also moved from side to side to follow the track, which is never perfectly circular. This means that the objective lens is housed in a device, itself movable and capable of moving the objective lens in two directions, and containing the actuating motors for those motions. These motors, while already quite miniaturized, are bulky and massive compared to the lens itself. The faster the disk spins, which is a desirable attribute from a system performance standpoint, the harder this motor must work and the bulkier and heavier it must become to provide accurate tracking and focus. Also, because the objective lens is not hard-mounted, but supported on flexible mounts, it will always be less rugged than it could be if fixed in place. The construction limit the speeds at which the objective lens can safely be moved and how forcefully it can be actuated.

Other systems described in the literature have improved on construction by splitting the optics into fixed and moving sections. This is described in a published paper: Magneto-Optical Disk For Coded Data Storage, M. Ojima, et. al. SPIE Vol. 529, Optical Mass Data Storage (1985) p. 12. In the system described in the article, only the focusing objective lens and its two dimensional actuator are moved over the disk, and the stated access time of 100 msec is fast for a read/write device. However, the requirement to move the actuator over the disk for scanning is still one of the characteristics limiting this speed.

It has been demonstrated that one of these functions, the tracking action, can be accomplished without moving the objective lens from side to side. A mirror mounted on a galvanometer can steer the beam of light, and if the system is properly designed, this beam will still enter the objective and be focussed on the disk. The spot is moved from side to side without moving the objective lens. However, this lens must still be actuated axially to maintain focus.

The optical system in accordance with the invention discloses a construction that, by reducing mass, complexity, and delicacy of the optical system or subsystem to be moved for scanning the disk, allows faster access from one section of a data storage disk to another. Such an improvement in speed allows use of optical storage devices in more demanding applications, where Winchester drives are now used in small, medium and large computer systems.

A movable optical head structure, that is, the structure movable over the disk surface to scan the disk, includes a fixed optical arrangement. Fine focussing and side-to-side adjustments for scanning are effected by movements of another lens mounted on a substantially stationary part of the system structure. This movable lens is generally aligned with the axis of the fixed lens on the movable head structure. Thus, motors for adjusting the optical system are not present on the movable head structure, which accordingly can be light in weight although ruggedly constructed. In an alternative embodiment, lateral adjustments to the position of the scanning spot are made by pivoting a reflecting mirror on the stationary structure and axial or focussing adjustments of the scanning spot are made by axially moving the aforesaid lens on the fixed structure. Light paths on the movable head structure adjacent the recording disk may be altered by means of reflecting mirrors, all such mirrors being in fixed relationship with the fixed objective lens. The movable head structure bearing fixed lenses and fixed mirrors moves in an arc to traverse the tracks on the disk in order to locate the desired track. The center of arc of the head structure is not the center of disk rotation.

Accordingly, it is an object of this invention to provide an improved optical system for fast access optical storage which allows for rapid physical response in focussing on a disk track, which may not be concentric to the axis of rotation, nor be on a flat surface.

A further object of this invention is to provide an improved optical system for fast access optical storage which positions drive and focus motors on stationary portions of the scanning structure thereby allowing rapid response time of the moving portions.

A further object of this invention is to provide an improved optical system designed for fast access optical storage which uses a rigidized optical subsystem on the moving head portion of the scanning apparatus, providing a rugged construction.

Still other objects and advantages of the invention will in part be obvious and in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1a is a functional schematic of an optical system for a fast access optical data storage device in accordance with the invention;

FIG. 1b illustrates tracking adjustment for the optical system of FIG. 1a;

FIG. 1c illustrates fine focussing of the optical system of FIG. 1a;

DESCRIPTION OF THE PREFERRED EMBODIMENT

Figure 2:
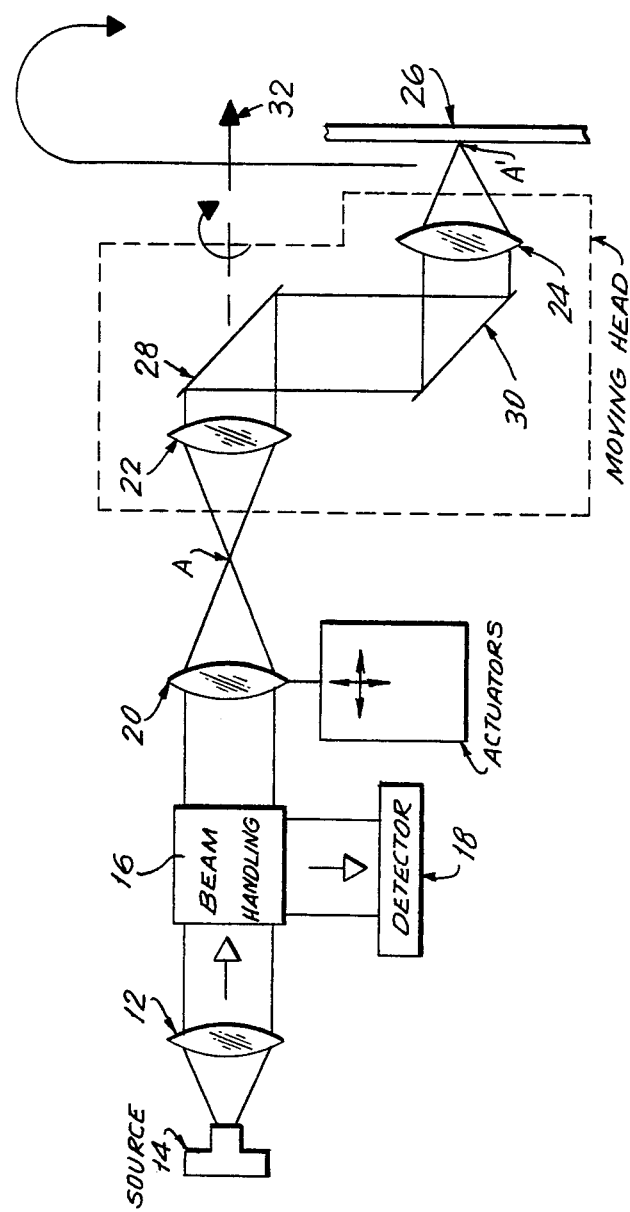
FIG. 2 is an alternative embodiment of an optical system for a fast access optical data storage device in accordance with the invention.

The optical system in accordance with the invention is configured so that a head subsystem 10 which must be moved over large ranges to access various regions of a data storage disk is a monolithic device. In it, an objective lens is solidly mounted to its housing, and there is no actuating motor. This makes the device light and rugged.

A simplified drawing of the optics is illustraed in FIG. 1a. Lens 12 collimates light emitted by a light source 14, which light then passes through a beam handling subsystem 16, which also directs light returning from a disk 26 to a detector subsystem 18.

A lens 20 is mounted on a two dimensional actuator (not shown) of a standard system for tracking and focussing. Lenses 22 and 24 are a unit conjugate imaging pair, i.e. 1:1, relaying the first focus point A of the lens 20 to the second focus point A' of the lens 24. When the lens 20 is moved sideways, as in FIG. 1b, the first focus point A moves sideways to point B, and the relayed second focus will move from point A' to point B'. This allows the tracking actuator (not shown) which moves the lens 20 to be located on a fixed mount, and not travel with the objective lens 24 as it searches across the disk 26.

When the lens 20 of FIG. 1 is moved axially, as in FIG. 1c, the first focus point A follows the lens 20 to point C. The relayed second focus point A' will then move to point C'. In this manner, a focussing action is accomplished without specifically moving the objective lens 24. A focus actuator (not shown) which axially moves the lens 20 is located in a fixed mount, and like the tracking actuator, does not travel with the objective lens 24.

FIG. 2, using similar reference numerals for similar elements, shows a similar system which is folded by using two mirrors 28, 30 between the conjugate imaging pair 22, 24. When this subsystem 10 is rotated around the indicated axis 32, the lens 24 moves over the disk surface from track to track while maintaining constant distance from, and relative optical alignment to, lens 22. This constant distance is required to prevent linear motion of the objective lens 24 from affecting the focal position of the relayed spot A'. As in the system of FIGS. 1a–c, the lateral and axial adjustment of the focal position A' is effected by repositioning lens 20, a component of the stationary structure 12–20.

FIG. 5, again using similar reference numerals, is another alternative embodiment of an optical system for fast access optical data storage device in accordance with the invention.

The moving head portion 10, that is, the portion of the optical system which traverses the data disk, as in the embodiment of FIG. 2, includes mirrors 28, 30 bending the light path between lenses 22, 24. An intermediate image A" is formed between the lenses 22, 24. As in the embodiment of FIG. 2, the lens 24 moves in an arc over the disk surface from track to track by rotation about the axis 32 through the lens 22. In a general case where the lens 20 is moved axially and the galvo-mirror 34 is pivoted slightly off axis, departure of the chief ray from the center of the objective lens 24 is minimal.

Figure 3:
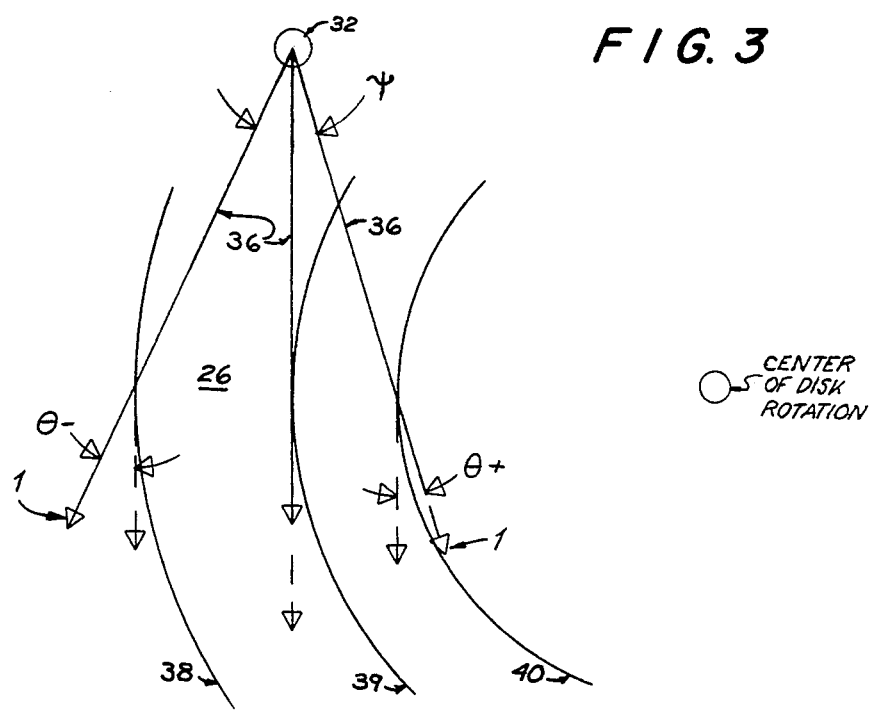
FIG. 3 illustrates scanning positions of a conventional electromagnetic head.

An advantage of these systems with mirrors on the moving head portion 10 (FIGS. 2, 5) is that yaw of the relayed field is quite small. In magnetic disk drives that use a pivoting arm for actuation, alignment of the head with the track deviates from a true tangential line. As illustrated in FIG. 3, as the arm 36, shown in several positions from the outermost track 38 to the innermost track 40, swings through an angle $\Psi$, the head "skews" through angles from $\theta-$ to $\theta+$ from the track tangents. This is a detriment to proper writing and a limiting factor in performance of such a magnetic system actuator.

In an optical system, this skewing from a tangent would also cause problems, not with the read/write spot which is round, but with alignment of the detector and field. The detector must be aligned in rotation with respect to the track for many purposes, such as single spot tracking used in many of the simple compact disk players, and such a rotation would be a large error. In other systems, there are more than one spot, as with the twin spot tracking systems common on newer compact disk players. A large rotation of these spots would also be unacceptable.

Figure 4:
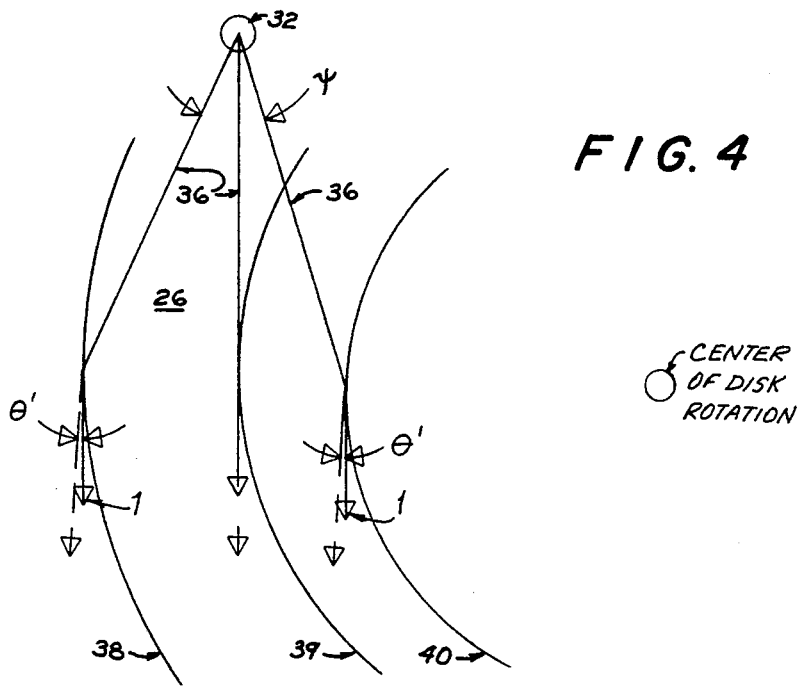
FIG. 4 illustrates scanning positions of a movable head portion in accordance with the invention.
Figure 5:
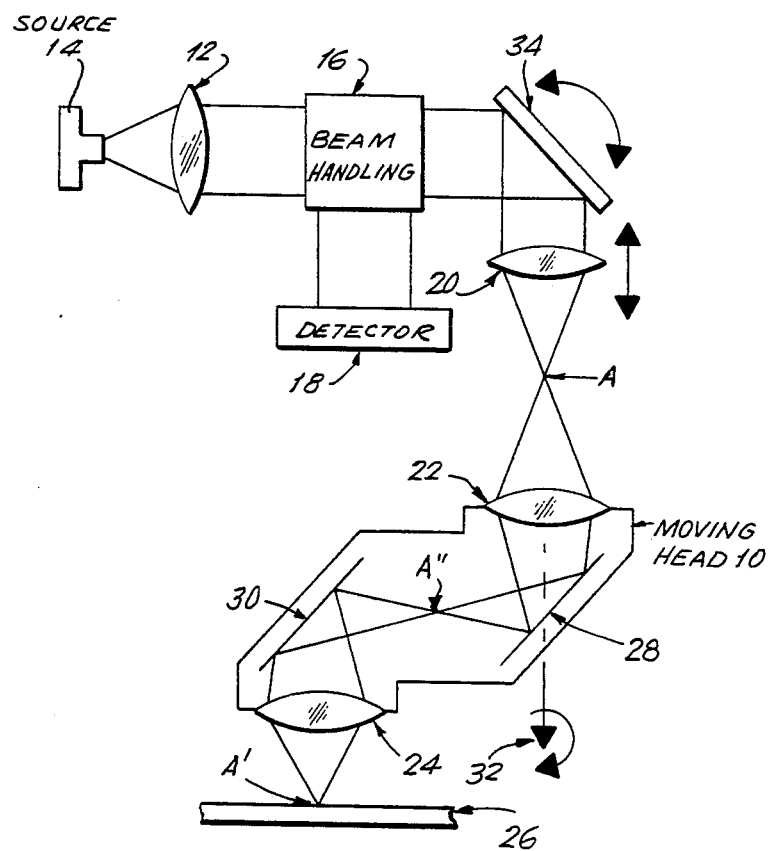
FIG. 5 is another alternative embodiment of an optical system for a fast access optical data storage device in accordance with the invention.

In an optical system in accordance with the invention such as shown in FIGS. 2, 5, this yaw is much reduced. FIG. 4 shows how, because a representative vector 1 in the relayed field retains a fixed orientation, the yaw angle $\theta'$ is a small fraction of the angle $\Psi$ which is swung through. Furthermore, this error from a true track tangent is positive for both inward and outward rotation, to scan the inner and outer tracks, allowing a compromise in rotation to reduce this skewing error by another factor of two. Thus the optical system (FIG. 4) has an advantage over the mechanical system (FIG. 3).

In another alternative embodiment in accordance with the invention, the finite conjugate lenses 22, 24 of FIG. 5, which have a unit ratio, may be replaced with finite conjugate lenses of unequal focal length so as to leverage the axial motion of the focal spot at the surface of the disk 26.

Thus, by designing the optical system so that the fine focus actuator and the fine tracking actuator are located in the fixed system optics and not in the moving head subsystem, many improvements in the system performance are achievable. By reducing the weight of components that move searching over the data region of the disk, higher speeds may be achieved and access times reduced, even for the same amount of actuating force. Because the optics on the moving head are monolithic, and hence rugged, more force may be applied without damaging or perturbing the lenses on the moving head. Also, increased ability to withstand the shock of a runaway crash stop allows for higher margins and speeds. Because the weight of the focus and tracking actuators is no longer important to access time of the machine, actuators can be made large to whatever degree is required to increase performance and stability.

The optical system of FIG. 5 has a further advantage by using finite conjugate lenses 22, 24 which allows for unequal focal lengths for the lenses. This gives another degree of freedom in selecting numerical apertures and diameters of the lens and there can be greater stability and latitude in focus.

What is claimed is:

1. An optical system for a fast access optical storage device, said system being used for passing an energy beam from a light source to a spot on the recording surface of a recording medium, said medium rotating about an axis, comprising:
- a non-moving portion of said optical system, said non-moving portion including first optics and actuators for focus control and fine tracking control of said system, said actuators operating to move portions of said first optics;
- a moving portion of said optical system said moving portion including second optics having a plurality of elements, said moving portion being subject to movement as a monolithic component over said recording surface, physical relationships between said plurality of elements being fixed.

2. An optical system for a fast access optical storage device as claimed in claim 1, said first optics providing a focal point A of said beam, said actuators precisely controlling in both the axial direction and the lateral direction the position of said focal point A, said second optics relaying said focal point A to a focus A', said moving portion with said second optics being mounted for extensive lateral movement over said recording surface.

3. An optical system as claimed in claim 2, wherein said second optics includes at least one objective lens, said focus A' being provided by said one objective lens, said one objective lens being mounted to said moving portion for pivoting about an axis displaced from the axis of said one objective lens in an arc extending through a preselected angular range, said angular range allowing said focus A', to move in an arc which is generally radial relative to the rotatig axis of said recording surface.

4. An optical system as claimed in claim 3 wherein one said actuator is a galvanometer mounted mirror and wherein lateral movement of said focus A' is accomplished by steering said beam with said galvanometer mounted mirror, said mirror being positioned between said beam source and said focal point A, said beam being reflected from said mirror to said focal point A and via said relaying optics to said focus A', movement of said mirror by said galvanometer laterally moving said focal point A and laterally moving said focus A' over said recording surface.

5. An optical system as claimed in claim 4, wherein said galvanometer mounted mirror is located at a point nominally conjugate to the pupil of said one objective lens of said second optics, said one objective lens being adjacent said recording surface.

6. An optical system as claimed in claim 2, wherein said relaying second optics include a pair of conjugate objectives relaying said focal point A to said focus A at unit magnification.

7. An optical system as claimed in claim 2, wherein said relaying second optics include a pair of finite conjugate objectives relaying said focal point A to said focus A, at other than unit magnification.

8. An optical system as claimed in claim 3 wherein said first optics includes an objective lens forming said focal point A, and wherein lateral movement of said focus A' is accomplished by translating in a direction corresponding to the radial direction on said disk surface, said objective lens forming focal point A.

9. An optical system as claimed in claim 3, wherein said second optics includes a pair of conjugate objective lenses, and further comprising at least one mirror positioned between said pair of conjugate objectives, said light beam being deflected by said mirror, pivoting said moving portion about the center of the conjugate objective closest to said focal point A providing said extensive lateral motion of said moving portion over said recording surface.

10. An optical system for a fast access optical storage device, said system being used for passing an energy beam from a light source to a spot on the recording surface of a recording medium, said medium rotating about an axis, comprising:
- actuators located in a non-moving portion of said optical system for focus control and fine tracking control of said system;
- a moving portion of said system containing optics, said optics and said moving portion being moved as a monolithic component and including optical means for relaying a focal point A, said point A being movably positioned both laterally and axially with respect to the optic axis of said system by said actuators located in said non-moving portion, said focal point being relayed to a focus A' on said recording surface of said medium, said moving portion being an optical pivot arm, pivoting of said arm moving said focus A', to a locus of positions in a circular arc across said recording surface.

11. An optical system as claimed in claim 10 wherein said optical pivot arm includes a pair of finite conjugate objective as, said objectives relaying said focal point A at unit magnification.

12. An optical system is claimed in claim 10, wherein said optical pivot arm includes a pair of finite conjugate objectives relaying said focal point A at other than unit magnification.

13. An optical system as claimed in claim 10, wherein said optical means for relaying include a pair of conjugate objectives, and further comprising a galvanometer mounted mirror located at a point nominally conjugate to the pupil of the objective lens of said pair which is closest to said recording surface, movement of said mirror by activation of said galvanometer causing lateral movement of said focal point A by steering said beam.

14. An optical system is claimed in claim 10, wherein said non-moving part includes an objective lens forming said focal point A, lateral movement of said focal point A being accomplished by translating said objective lens in a direction corresponding to the radial direction of said rotating recording surface after said focal point A is relayed by said relay optics, translation of said objective lens being accomplished by said actuator for fine tracking control.

* * * * *